United States Patent
Kawase et al.

(10) Patent No.: US 11,476,476 B2
(45) Date of Patent: Oct. 18, 2022

(54) FUEL CELL SYSTEM AND CONTROL METHOD OF FUEL CELL SYSTEM

(71) Applicant: Honda Motor Co., Ltd., Tokyo (JP)

(72) Inventors: Satoru Kawase, Tokyo (JP); Takanori Mori, Tokyo (JP); Shinji Matsunaga, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 17/464,692

(22) Filed: Sep. 2, 2021

(65) Prior Publication Data
US 2022/0069321 A1 Mar. 3, 2022

(30) Foreign Application Priority Data
Sep. 2, 2020 (JP) .............................. JP2020-147573

(51) Int. Cl.
*H01M 8/04089* (2016.01)
*H01M 8/0438* (2016.01)

(52) U.S. Cl.
CPC ..... *H01M 8/04089* (2013.01); *H01M 8/0438* (2013.01); *H01M 2250/20* (2013.01)

(58) Field of Classification Search
CPC ........... H01M 8/04089; H01M 8/0438; H01M 8/04201; H01M 8/04425; H01M 8/04955; H01M 8/04753; H01M 8/2457
See application file for complete search history.

(56) References Cited

U.S. PATENT DOCUMENTS

| 2019/0036139 A1* | 1/2019 | Tsubouchi | H01M 8/04425 |
| 2019/0280314 A1* | 9/2019 | Katayama | H01M 8/04626 |
| 2021/0194023 A1* | 6/2021 | Morinaga | H01M 8/04201 |

FOREIGN PATENT DOCUMENTS

| JP | 2006338967 | 12/2006 |
| JP | 2017096342 | 6/2017 |
| JP | 2019149267 | 9/2019 |
| JP | 2020077574 | 5/2020 |

OTHER PUBLICATIONS

Office Action of Japan Counterpart Application, with English translation thereof, dated Mar. 22, 2022, pp. 1-6.
"Office Action of Japan Counterpart Application" with English translation thereof, dated Aug. 9, 2022, p. 1-p. 4.

\* cited by examiner

*Primary Examiner* — Stewart A Fraser
(74) *Attorney, Agent, or Firm* — JCIPRNET

(57) ABSTRACT

A fuel cell system includes a plurality of electricity generation systems and a connection flow path through which fuel flows between the plurality of electricity generation systems. Each electricity generation system includes a fuel tank, a fuel cell stack, a fuel flow path, a first pressure sensor, a shutoff valve, a control device, and a branch portion. The first pressure sensor is arranged in the fuel flow path and detects a fuel pressure on the fuel tank side. The shutoff valve is arranged on a downstream side of the first pressure sensor in the fuel flow path, and is switched between flow and shutoff of the fuel by opening and closing. The branch portion branches from the fuel flow path on a downstream side of the shutoff valve in the fuel flow path. The connection flow path connects the mutual branch portions of the plurality of electricity generation systems.

10 Claims, 4 Drawing Sheets

FUEL CELL SYSTEM AND CONTROL METHOD OF FUEL CELL SYSTEM

CROSS-REFERENCE TO RELATED APPLICATION

This application claims the priority benefit of Japan application serial no. 2020-147573, filed on Sep. 2, 2020. The entirety of the above-mentioned patent application is hereby incorporated by reference herein and made a part of this specification.

BACKGROUND

Technical Field

The disclosure relates to a fuel cell system and a control method of a fuel cell system.

Related Art

Conventionally, for example, a fuel cell system is known which includes a connection flow path connecting, on an upstream side of a regulator, mutual fuel gas supply flow paths of a plurality of subsystems (see Patent literature 1 (Japanese Patent Laid-Open No. 2019-149267) for example).

Conventionally, for example, a fuel cell system is known which includes a common passage connected to a plurality of tanks, and makes valves of some of the tanks including the tank having a highest internal pressure among the plurality of tanks into an open state, and makes valves of the other tanks into a closed state (see Patent literature 2 (Japanese Patent Laid-Open No. 2017-096342) for example).

Meanwhile, in the above-described fuel cell system, because the plurality of high-pressure tanks are connected on the upstream side of the regulator, it is necessary to stop the supply of the fuel gas from all the high-pressure tanks when, for example, an abnormality occurs in some of the high-pressure tanks. However, if the electricity generation of the fuel cell system is stopped due to the abnormality in some of the high-pressure tanks, actuation of the equipment on which the fuel cell system is mounted as an electric source may be stopped. In addition, in the above-described fuel cell system, because the opening and closing of each valve is switched for eliminating the pressure difference between the plurality of tanks, the opening/closing switching frequency of each valve may increase when, for example, the pressure of each tank fluctuates with the actuation of the fuel cell system. In response to the increase of the opening/closing switching frequency of each valve, it becomes necessary to increase the durability of each valve, which may increase the cost required for the configuration.

The disclosure provides a fuel cell system and a control method of a fuel cell system capable of securing a desired output while suppressing an increase of the cost required for the configuration.

SUMMARY

The disclosure adopts the following aspect.

A fuel cell system according to an aspect of the disclosure includes a plurality of electricity generation systems and a connection flow path through which fuel flows between the plurality of electricity generation systems. Each of the plurality of electricity generation systems includes: a fuel tank which stores the fuel, a fuel cell stack which generates electricity by the fuel supplied from the fuel tank, a fuel flow path which is connected to the fuel tank and the fuel cell stack and flows the fuel, a pressure sensor which is arranged in the fuel flow path and detects a pressure of the fuel on the fuel tank side, a valve which is arranged on a downstream side of the pressure sensor in the fuel flow path and is switched between flow and shutoff of the fuel by opening and closing, a control portion which controls the opening and closing of the valve according to a detection value of the pressure of the fuel output from the pressure sensor, and a branch portion which branches from the fuel flow path on a downstream side of the valve in the fuel flow path. The connection flow path connects the mutual branch portions of the plurality of electricity generation systems.

DESCRIPTION OF THE EMBODIMENTS

Figure 1:
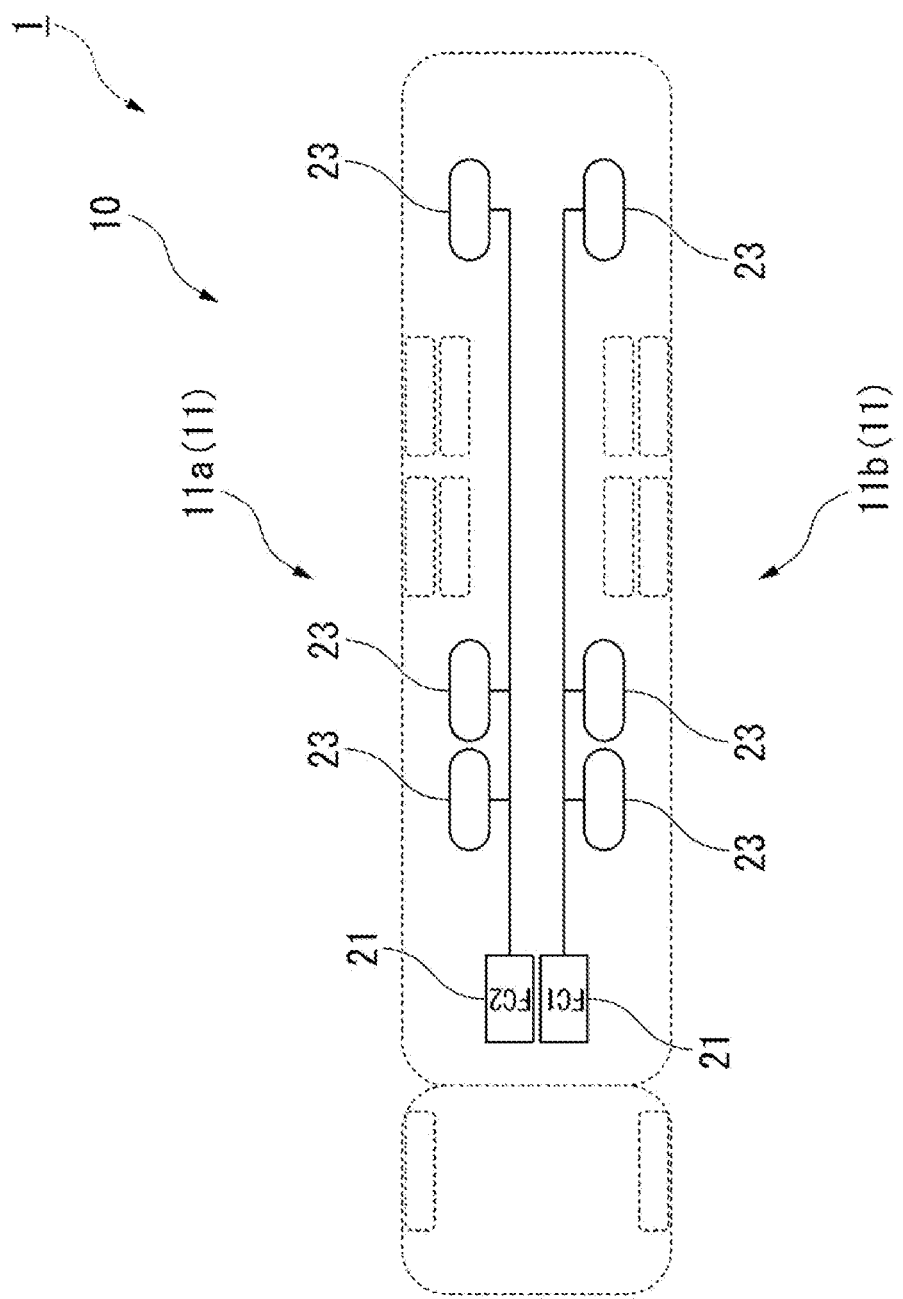
FIG. 1 is a diagram schematically showing a configuration of a vehicle on which a fuel cell system in an embodiment of the disclosure is mounted.

The disclosure adopts the following aspects.

(1) A fuel cell system according to an aspect of the disclosure (for example, a fuel cell system 10 in an embodiment) includes a plurality of electricity generation systems (for example, electricity generation systems 11 in the embodiment) and a connection flow path (for example, a connection flow path 41 in the embodiment) through which fuel (for example, hydrogen in the embodiment) flows between the plurality of electricity generation systems. Each of the plurality of electricity generation systems includes: a fuel tank (for example, a fuel tank 15 in the embodiment) which stores the fuel, a fuel cell stack (for example, a fuel cell stack 21 in the embodiment) which generates electricity by the fuel supplied from the fuel tank, a fuel flow path (for example, a fuel flow path 24 in the embodiment) which is connected to the fuel tank and the fuel cell stack and flows the fuel, a pressure sensor (for example, a first pressure sensor 35 in the embodiment) which is arranged in the fuel flow path and detects a pressure of the fuel on the fuel tank side, a valve (for example, a shutoff valve 34 in the embodiment) which is arranged on a downstream side of the pressure sensor in the fuel flow path and is switched between flow and shutoff of the fuel by opening and closing, a control portion (for example, a control device 27 in the embodiment) which controls the opening and closing of the valve according to a detection value of the pressure of the fuel output from the pressure sensor, and a branch portion (for example, a branch portion 26 in the embodiment) which branches from the fuel flow path on a downstream side of the valve in the fuel flow path. The connection flow path connects the mutual branch portions of the plurality of electricity generation systems.

(2) In the fuel cell system according to (1) above, each of the plurality of electricity generation systems may include a pressure regulation valve (for example, a second pressure regulation valve 32 in the embodiment) which is arranged on an upstream side of the branch portion in the fuel flow path and is in an open state when a pressure of the fuel on the downstream side is equal to or lower than a predetermined pressure, and a bypass flow path (for example, a bypass flow path 33 in the embodiment) which is arranged on the upstream side of the branch portion in the fuel flow path and bypasses the pressure regulation valve so as to be connected to the fuel flow path, and in which the valve is arranged.

(3) A control method of a fuel cell system according to an aspect of the disclosure is executed by the control portion of the fuel cell system according to (1) or (2) above, and includes a step (for example, Step S03 and Step S04 in the embodiment) in which the control portion switches, based on detection values of the fuel pressures output from the pressure sensors of the plurality of electricity generation systems, the valve of the electricity generation system corresponding to the pressure among the pressures in the plurality of electricity generation systems which is lower than the pressure in the other electricity generation system from an open state to a closed state.

(4) The control method of a fuel cell system according to (3) above may include a step (for example, Step S03 and Step S04 in the embodiment) in which the control portion switches the valve of the electricity generation system corresponding to the pressure among the pressures in the plurality of electricity generation systems which is lower than the pressure in the other electricity generation system by a predetermined pressure difference or more from an open state to a closed state.

(5) The control method of the fuel cell system according to (3) or (4) above may include a step (for example, Step S06 and Step S07 in the embodiment) in which the control portion switches the valve in the closed state to the open state in a case other than a state that the pressure in the electricity generation system corresponding to the valve in the closed state is lower than the pressure in the other electricity generation system by a predetermined pressure or more.

According to (1) above, the connection flow path is included on the downstream side of the valve in the fuel flow path, and thereby the fuel supply to the fuel cell stack can be continued regardless of the opening and closing of the valve. Thereby, even when, for example, an abnormality occurs on the fuel tank side of each electricity generation system, the abnormality occurrence part can be isolated only by a simple operation of making the valve into the closed state, while the electricity generation of the fuel cell stack is continued.

In the case of (2) above, because the pressure regulation valve of the fuel flow path is arranged in parallel with the valve of the bypass flow path, for example, when the fuel pressure on the downstream side is reduced due to the increase of the fuel consumption amount in the fuel cell stack, even when the valve is in a closed state, the fuel supply can be secured by opening the pressure regulation valve. Thereby, even in a state that the differential pressure of the fuel tank side pressures between the plurality of electricity generation systems is eliminated by closing the valve, the appropriate fuel supply can be maintained following a fuel pressure change due to the increase of the fuel consumption on the downstream side.

According to (3) above, even when a differential pressure is generated in the fuel tank side pressures between the plurality of electricity generation systems, the fuel supply can be stopped and the differential pressure can be eliminated by a simple operation of closing the valve.

In the case of (4) above, the differential pressure of the fuel tank side pressures between the plurality of electricity generation systems is suppressed from becoming a predetermined pressure difference or more, the mutual pressure changes are made uniform, and thereby it can be prevented that only one of the plurality of electricity generation systems stops electricity generation in an early stage.

In the case of (5) above, the valves of some of the electricity generation systems can be suppressed from being in a closed state excessively, and the electricity generation efficiency of the entire fuel cell system can be improved.

A vehicle 1 including a fuel cell system 10 according to an embodiment of the disclosure is described below with reference to the accompanying drawings.

Figure 2:
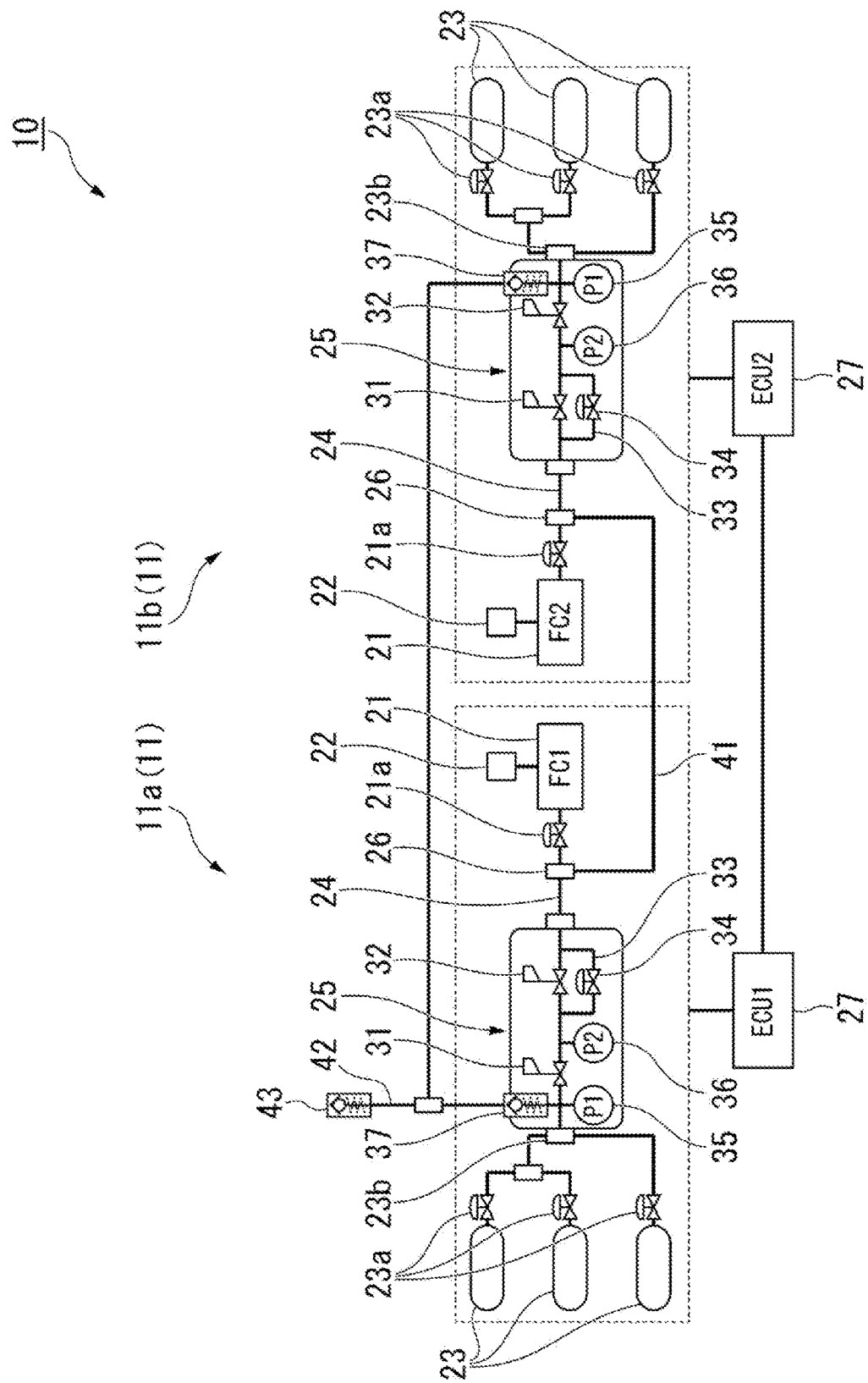
FIG. 2 is a diagram showing a configuration of the fuel cell system in the embodiment of the disclosure.

FIG. 1 is a diagram schematically showing a configuration of the vehicle 1 on which the fuel cell system 10 in the embodiment is mounted. FIG. 2 is a diagram showing a configuration of the fuel cell system 10 in the embodiment.

The fuel cell system 10 of the embodiment is mounted on the large vehicle 1 such as a truck, a bus, or the like. The vehicle 1 includes, for example, an electric source such as the fuel cell system 10, an electricity storage device, or the like, and an equipment such as a rotation electric machine or the like connected to the electric source.

The fuel cell system 10 includes a plurality of electricity generation systems 11. The plurality of electricity generation systems 11 are, for example, a first electricity generation system 11a and a second electricity generation system 11b.

Each of the plurality of electricity generation systems 11 includes a fuel cell stack 21, an air pump 22, a plurality of fuel tanks 23, a fuel flow path 24, a valve mechanism 25, a branch portion 26, and a control device 27.

The fuel cell stack (FC1, FC2) 21 is, for example, a polymer electrolyte fuel cell. The polymer electrolyte fuel cell includes a plurality of fuel battery cells which are laminated and a pair of end plates which sandwiches the lamination body of the plurality of fuel battery cells. The fuel battery cell includes an electrolyte electrode structure and a pair of separators that sandwiches the electrolyte electrode structure. The electrolyte electrode structure includes a solid polymer electrolyte membrane, and a fuel electrode and an oxygen electrode that sandwich the solid polymer electrolyte membrane. The solid polymer electrolyte membrane includes a cation exchange membrane and the like. The fuel electrode (anode) includes an anode catalyst, a gas diffusion layer, and the like. The oxygen electrode (cathode) includes a cathode catalyst, a gas diffusion layer, and the like.

The fuel cell stack 21 generates electricity by a catalytic reaction between the fuel gas supplied from the plurality of fuel tanks 23 to the anode and the oxidant gas such as oxygen-containing air or the like supplied from the air pump 22 to the cathode.

The supply port of the anode of the fuel cell stack 21 is connected to the fuel flow path 24 via an opening/closing valve 21a.

The plurality of fuel tanks 23 are connected to the fuel flow path 24 via opening/closing valves 23a. The plurality of fuel tanks 23 store fuel. The fuel is, for example, hydrogen or the like. Each of the plurality of fuel tanks 23 supplies the fuel to the fuel cell stack 21.

The fuel flow path 24 is, for example, a pipe or the like for flowing the fuel inside, and connects the plurality of fuel tanks 23 and the supply port of the fuel electrode of the fuel cell stack 21.

The valve mechanism 25 is arranged between the opening/closing valve 21a of the fuel cell stack 21 and a confluence portion 23b of the plurality of fuel tanks 23 in the fuel flow path 24.

The valve mechanism 25 includes a first pressure regulation valve 31, a second pressure regulation valve 32, a bypass flow path 33, a shutoff valve 34, a first pressure sensor 35, a second pressure sensor 36, and a check valve 37.

The first pressure regulation valve 31 and the second pressure regulation valve 32 are sequentially arranged from an upstream side to a downstream side of the fuel flow path 24. The first pressure regulation valve 31 regulates (for example, reduces) the pressure of the fuel supplied from the plurality of fuel tanks 23 to a predetermined pressure and outputs the pressure. The second pressure regulation valve 32 is in a closed state in the working of the fuel cell system 10 in a reference mode. The second pressure regulation valve 32 is mechanically switched from the closed state to an open state by an elastic member or the like included inside when, for example, the fuel pressure on the downstream side becomes equal to or lower than the predetermined pressure according to the increase of the fuel consumption in the fuel cell stack 21 and the like. When the state in which the fuel pressure on the downstream side is equal to or lower than the predetermined pressure is resolved, the second pressure regulation valve 32 is mechanically switched from the open state to the closed state.

The bypass flow path 33 is, for example, a pipe or the like for flowing the fuel inside, and is connected to the fuel flow path 24 by bypassing the second pressure regulation valve 32. The shutoff valve 34 is arranged in the bypass flow path 33. The shutoff valve 34 is switched between flow and shutoff of the fuel by opening and closing according to a control signal output from the control device 27. The shutoff valve 34 is in an open state in the working of the electricity generation system 11 in a reference mode. When a pressure P in the fuel flow path 24 on the side of the plurality of fuel tanks 23 is lower than a pressure P in the other electricity generation system 11 by a predetermined pressure difference or more, the shutoff valve 34 is switched from the open state to a closed state. When the state in which the pressure P in the fuel flow path 24 on the side of the plurality of fuel tanks 23 is lower than the pressure P in the other electricity generation system 11 by a predetermined pressure difference or more is resolved, the shutoff valve 34 is switched from the closed state to the open state. The pressure P in the fuel flow path 24 on the side of the plurality of fuel tanks 23 is, for example, a first pressure P1 detected by the first pressure sensor 35 described later.

The first pressure sensor 35 is arranged on an upstream side of the first pressure regulation valve 31 in the fuel flow path 24. The first pressure sensor 35 detects the first pressure P1 which is the fuel pressure on the upstream side of the first pressure regulation valve 31, that is, the pressure of the fuel supplied from the plurality of fuel tanks 23, and outputs a signal of the detection value of the first pressure P1.

The second pressure sensor 36 detects a second pressure P2, which is a fuel pressure between the first pressure regulation valve 31 and the second pressure regulation valve 32 in the fuel flow path 24, and outputs a signal of the detection value of the second pressure P2.

The check valve 37 is arranged in a filling flow path 42 described later, which branches from the upstream side of the first pressure regulation valve 31 in the fuel flow path 24. The check valve 37 prohibits the flow of the fuel from the side of the plurality of fuel tanks 23 to the side of a fuel filling portion 43 described later, and allows the flow of the fuel from the side of the fuel filling portion 43 to the side of the plurality of fuel tanks 23.

The branch portion 26 is arranged on a downstream side of the valve mechanism 25 in the fuel flow path 24. The branch portion 26 branches from the fuel flow path 24 and is connected to a connection flow path 41 described later.

The control device (ECU1, ECU2) 27 integrally controls the operation of the electricity generation system 11 in cooperation with the control device 27 of the other electricity generation system 11, for example. The control device 27 is, for example, a software function portion that functions by executing a predetermined program by a processor such as a central processing unit (CPU) or the like. The software function portion is an electronic control unit (ECU) including electronic circuits such as a processor like a CPU, a read only memory (ROM) storing programs, a random access memory (RAM) temporarily storing data, a timer, and the like. At least a part of the control device 27 may be an integration circuit such as a large scale integration (LSI) or the like.

The control device 27 controls the opening and closing of the shutoff valve 34 of the valve mechanism 25 based on the pressures P in the fuel flow path 24 on the side of the plurality of fuel tanks 23. The control device 27 switches the shutoff valve 34 from the open state to the closed state when the pressure P is lower than the pressure P of the other electricity generation system 11. For example, the control device 27 switches the shutoff valve 34 from the open state to the closed state when the first pressure P1 detected by the first pressure sensor 35 is lower than the first pressure P1 of the other electricity generation system 11 by a predetermined pressure difference or more. The control device 27 switches the shutoff valve 34 from the closed state to the open state when the state in which the first pressure P1 detected by the first pressure sensor 35 is lower than the first pressure P1 of the other electricity generation system 11 by a predetermined pressure difference or more is resolved.

The fuel cell system 10 includes the connection flow path 41, the filling flow path 42, and the fuel filling portion 43.

The connection flow path 41 is, for example, a pipe or the like for flowing the fuel inside, and is connected to mutual branch portions 26 of the plurality of electricity generation systems 11.

The filling flow path 42 is, for example, a pipe or the like for flowing the fuel inside, and branches from the upstream side of the first pressure regulation valve 31 in the mutual fuel flow paths 24 of the plurality of electricity generation systems 11 and is connected to the fuel filling portion 43.

The fuel filling portion 43 includes, for example, a receptacle to which a filling nozzle of an external mobile or fixed fuel filling device is connected, a check valve, and the like. The fuel filling portion 43 in which a filling port receiving the fuel supplied from the external fuel filling device is formed is connected to each of the plurality of fuel tanks 23 via the filling flow path 42 and the check valve 37 of the valve mechanism 25 of each electricity generation system 11.

Figure 3:
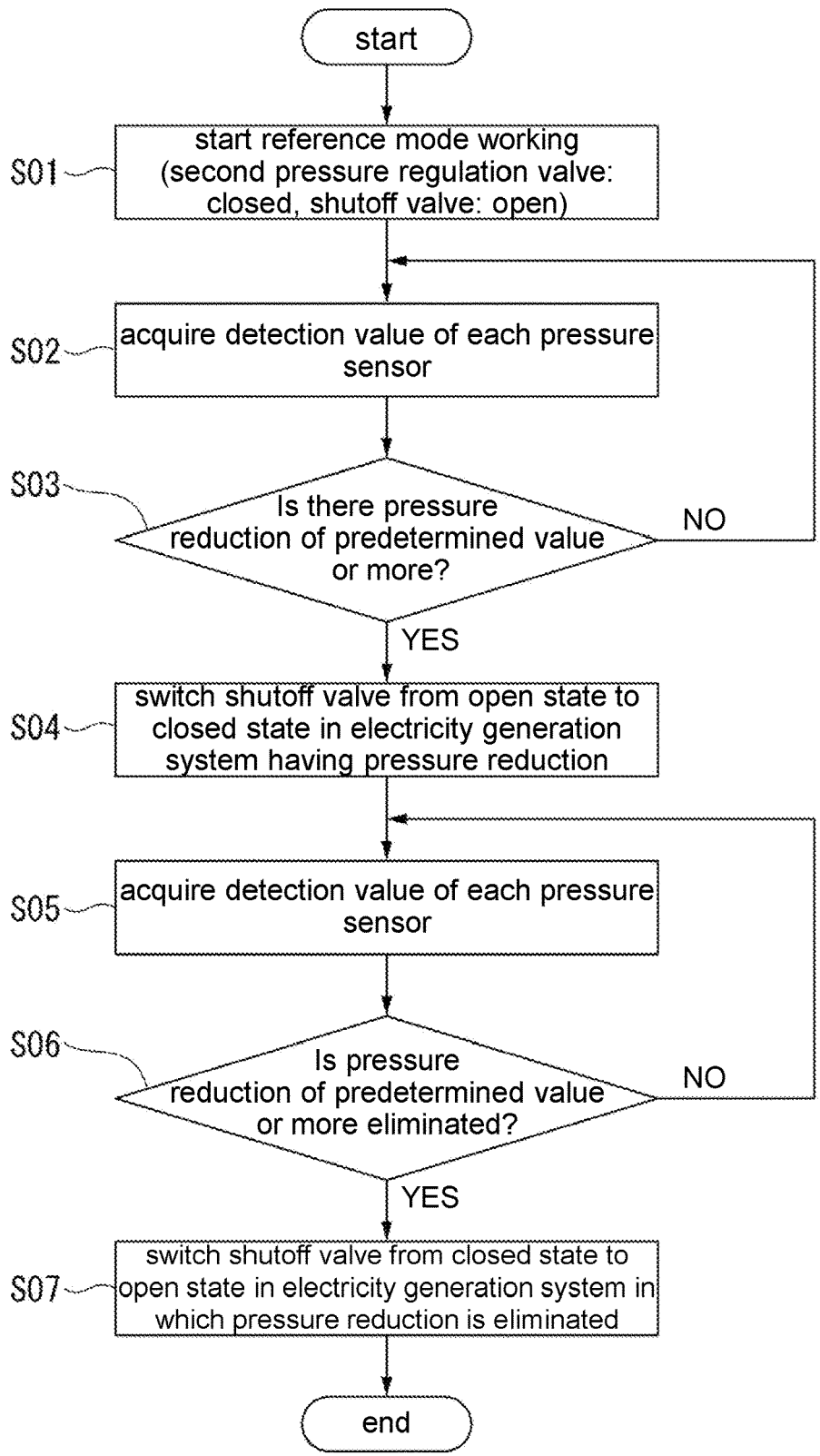
FIG. 3 is a flowchart showing a control method of a fuel cell system in the embodiment of the disclosure.
Figure 4:
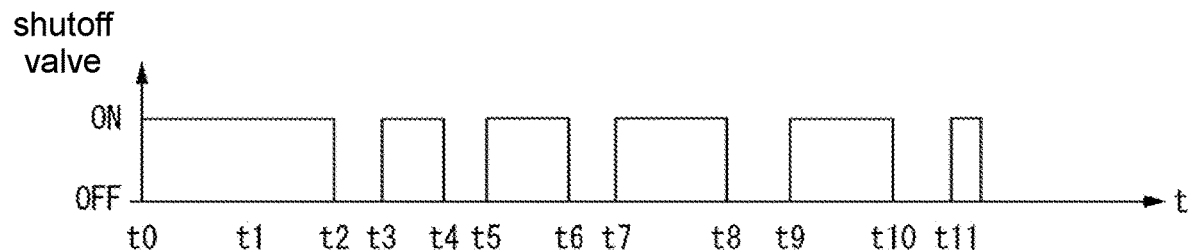
FIG. 4 is a diagram showing opening and closing of a shutoff valve of the fuel cell system in the embodiment of the disclosure and a change of a fuel pressure in a fuel flow path on a side of a plurality of fuel tanks.
Figure 4:
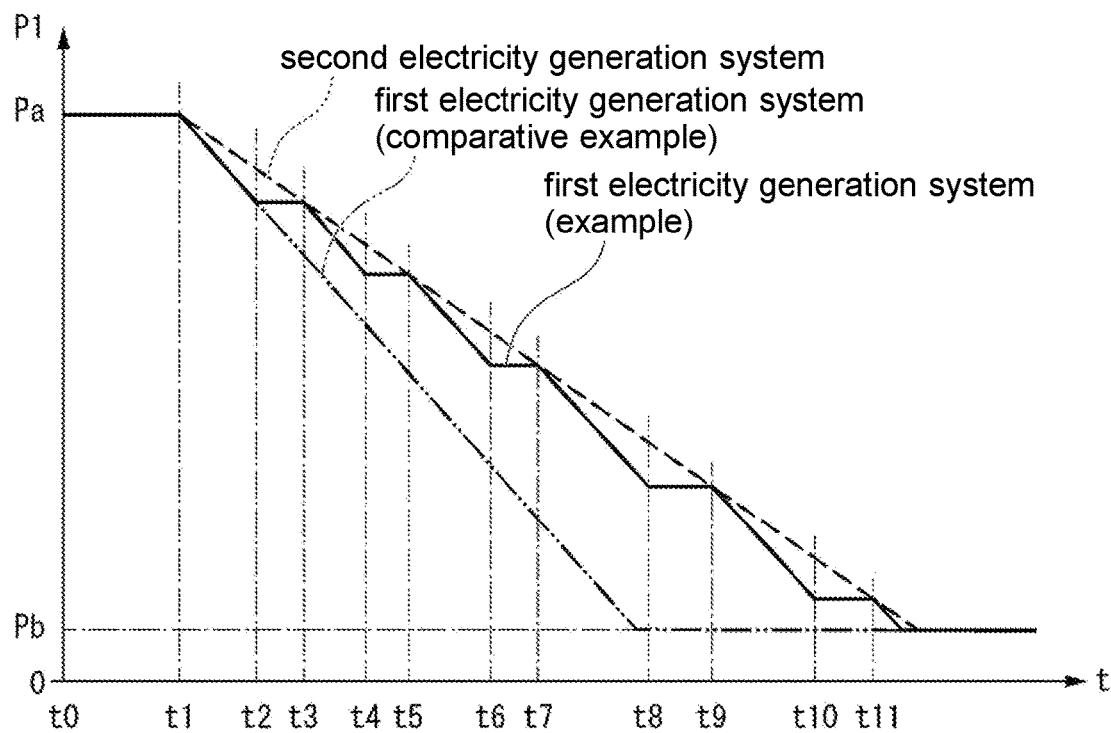

The operation of the fuel cell system 10 of the embodiment is described below. FIG. 3 is a flowchart showing a control method of the fuel cell system 10 in the embodiment. FIG. 4 is a diagram showing the opening and closing of the shutoff valve 34 of the fuel cell system 10 in the embodiment and the change of the fuel pressure in the fuel flow path 24 on the side of the plurality of fuel tanks 23.

First, in Step S01 shown in FIG. 3, the control device 27 starts the working of the electricity generation system 11 in the reference mode. In the working in the reference mode, in the open state of the opening/closing valves 23a of the plurality of fuel tanks 23 and the opening/closing valve 21a of the fuel cell stack 21, the first pressure regulation valve 31 performs the predetermined pressure regulation by opening. The second pressure regulation valve 32 is in a closed state so that it can be mechanically opened according to the pressure on the downstream side, and the shutoff valve 34 is in the open state.

Next, in Step S02, the control device 27 acquires the signal of each detection value of the first pressure P1 and the second pressure P2 output from the first pressure sensor 35 and the second pressure sensor 36, and acquires information of each detection value of the first pressure P1 and the second pressure P2 acquired by the control device 27 of the other electricity generation system 11.

Next, in Step S03, the control device 27 determines whether or not the first pressure P1 of its own electricity generation system 11 is lower than the first pressure P1 of the other electricity generation system 11 by a predetermined pressure difference or more.

When the determination result is "NO", the control device 27 repeats the process of Step S02.

On the other hand, when the determination result is "YES", the control device 27 advances the process to Step S04.

Next, in Step S04, the control device 27 switches the shutoff valve 34 from the open state to the closed state.

Next, in Step S05, the control device 27 acquires the signal of each detection value of the first pressure P1 and the second pressure P2 output from the first pressure sensor 35 and the second pressure sensor 36, and acquires information of each detection value of the first pressure P1 and the second pressure P2 acquired by the control device 27 of the other electricity generation system 11.

Next, in Step S06, the control device 27 determines whether or not the state in which the first pressure P1 of its own electricity generation system 11 is lower than the first pressure P1 of the other electricity generation system 11 by a predetermined pressure difference or more is resolved.

When the determination result is "NO", the control device 27 repeats the process of Step S05.

On the other hand, when the determination result is "YES", the control device 27 advances the process to Step S07.

Next, in Step S07, the control device 27 switches the shutoff valve 34 from the closed state to the open state, and advances the process to the end.

For example, FIG. 4 shows an example of a state in which the mutual first pressures P1 of the first electricity generation system 11a and the second electricity generation system 11b are reduced from a predetermined pressure Pa to a predetermined pressure Pb lower than the predetermined pressure Pa. For the fuel supply system configured by the plurality of fuel tanks 23 of each electricity generation system 11, for example, the predetermined pressure Pa corresponds to a full fuel filling state or the like of the fuel supply system, and the predetermined pressure Pb corresponds to a fuel shortage state or the like of the fuel supply system.

In the first electricity generation system 11a and the second electricity generation system 11b shown in FIG. 4, due to the difference of the fuel consumption amount in the mutual fuel cell stacks 21, the difference of the pressure loss in the mutual fuel flow paths 24, and the like, a difference equal to or greater than a predetermined value occurs in the fuel consumption rate of the mutual fuel supply systems.

In the first electricity generation system 11a and the second electricity generation system 11b according to a comparative example, the open state of the mutual shutoff valves 34 is maintained in the working state of the fuel cell system 10, and thereby the first pressure P1 of the first electricity generation system 11a according to the comparative example is reduced at a higher speed than the first pressure P1 of the second electricity generation system 11b.

In contrast, in the first electricity generation system 11a and the second electricity generation system 11b according to an example, the shutoff valve 34 of the first electricity generation system 11a according to the example is switched from the closed state to the open state according to the pressure difference of the mutual first pressures P1, and thereby the reduction of the first pressure P1 of the first electricity generation system 11a according to the example is suppressed. Thereby, in the first electricity generation system 11a according to the example, the earlier fuel shortage of the fuel supply system than the second electricity generation system 11b is suppressed as compared with the first electricity generation system 11a according to the comparative example.

In the first electricity generation system 11a according to the example shown in FIG. 4, the first pressure P1 of the first electricity generation system 11a starts to reduce after a time point t1, and at each of time points t2, t4, t6, t8, and t10, at which the first pressure P1 of the first electricity generation system 11a becomes lower than the first pressure P1 of the second electricity generation system 11b by a predetermined pressure difference or more, the shutoff valve 34 of the first electricity generation system 11a is switched from the open state (ON) to the closed state (OFF). Thereby, the reduction of the first pressure P1 of the first electricity generation system 11a is suppressed, and the pressure difference of the mutual first pressures P1 of the first electricity generation system 11a and the second electricity generation system 11b is reduced.

Then, in a case that the state in which the first pressure P1 of the first electricity generation system 11a is lower than the first pressure P1 of the second electricity generation system 11b by a predetermined pressure difference or more is resolved, for example, at each of time points t3, t5, t7, t9, and t11 at which the mutual first pressures P1 of the first electricity generation system 11a and the second electricity generation system 11b are substantially the same, the shutoff valve 34 of the first electricity generation system 11a is switched from the closed state (OFF) to the open state (ON).

Thereby, when a difference equal to or greater than a predetermined value occurs in the pressure change of the mutual fuel supply systems of the plurality of electricity generation systems 11, the shutoff valve 34 of the electricity generation system 11 having a lower pressure is switched from the open state (ON) to the closed state (OFF), and thereby the mutual pressure changes are made uniform.

As described above, by including the connection flow path 41 on a downstream side of the shutoff valve 34 in the fuel flow path 24, the fuel cell system 10 of the embodiment can continue the fuel supply to the fuel cell stack 21 regardless of the opening and closing of the shutoff valve 34. Thereby, even when, for example, an abnormality occurs on the fuel tank 23 side of each electricity generation system 11, the abnormality occurrence part can be isolated by making the shutoff valve 34 into the closed state, while the electricity generation of the fuel cell stack 21 is continued. Because the fuel supply can be stopped by the shutoff valve 34 without the necessity of actuating the opening/closing valve 23a of each fuel tank 23, there is no concern about increasing the number of times of actuating the opening/closing valve 23a.

Because the second pressure regulation valve 32 of the fuel flow path 24 is arranged in parallel with the shutoff valve 34 of the bypass flow path 33, for example, when the fuel pressure on the downstream side is reduced due to the increase of the fuel consumption amount in the fuel cell stack 21, even when the shutoff valve 34 is in a closed state, the fuel supply can be secured by mechanically opening the second pressure regulation valve 32. Thereby, even in a state that the differential pressure of the first pressures P1 between the plurality of electricity generation systems 11 is eliminated by closing the shutoff valve 34, the appropriate fuel supply can be maintained following the fuel pressure change due to the increase of the fuel consumption on the downstream side.

The first pressure regulation valve 31 which regulates (reduces) the pressure of the fuel from the plurality of fuel tanks 23 is included on an upstream side of the bypass flow path 33, and thereby the occurrence of abnormalities such as valve fixation due to the pressure difference on the upstream side and the downstream side of the shutoff valve 34 can be suppressed.

Variation Example

A variation example of the embodiment is described below. Moreover, the same parts as those in the above-described embodiment are designated by the same reference signs, and the description thereof is omitted or simplified.

In the above-described embodiment, each of the plurality of electricity generation systems 11 includes a plurality of fuel tanks 23, but the disclosure is not limited thereto, and each of the plurality of electricity generation systems 11 may include a single fuel tank 23.

In the above-described embodiment, the fuel cell system 10 includes the filling flow path 42 and the fuel filling portion 43 to which the check valves 37 of the mutual valve mechanisms 25 of the plurality of electricity generation systems 11 are commonly connected, but the disclosure is not limited thereto. For example, the fuel cell system 10 may include a plurality of filling flow paths 42 and fuel filling portions 43 that are individually and independently connected to the check valves 37 of the mutual valve mechanisms 25 of the plurality of electricity generation systems 11.

In the above-described embodiment, the plurality of electricity generation systems 11 include the control devices 27 that perform the control in cooperation with each other, but the disclosure is not limited thereto, and an integration control device which integrally controls the control devices 27 of the plurality of electricity generation systems 11 may be included. In this case, the opening and closing of the shutoff valve 34 of each electricity generation system 11 may be controlled by the integration control device instead of the control device 27.

In the above-described embodiment, the second pressure regulation valve 32 of each electricity generation system 11 is mechanically opened and closed according to the fuel pressure on the downstream side, but the disclosure is not limited thereto, and for example, the second pressure regulation valve 32 may be a control valve that is opened and closed by the control of the control device 27 according to the fuel pressure on the downstream side, the fuel consumption amount required in the fuel cell stack 21, and the like.

In the above-described embodiment, an example is described in which the fuel cell system is mounted on a fuel cell vehicle that uses the electric power generated in the fuel cell as the electric power for traveling or the electric power for the operation of the onboard equipment. However, the system may also be mounted on automobiles of two wheels, three wheels, four wheels and so on, and other movement objects (for example, ships, flying objects, and robots), and may also be mounted on stationary or portable fuel cell systems.

The embodiments of the disclosure are presented as examples and are not intended to limit the scope of the invention. These embodiments can be implemented in various other forms, and various omissions, replacements, and changes can be made without departing from the gist of the invention. These embodiments and modifications thereof are included in the scope and the gist of the invention, as well as in the inventions described in the claims and the equivalent scope thereof.

What is claimed is:

1. A fuel cell system,
comprising a plurality of electricity generation systems and a connection flow path through which fuel flows between the plurality of electricity generation systems, wherein
each of the plurality of electricity generation systems comprises:
a fuel tank which stores the fuel,
a fuel cell stack which generates electricity by the fuel supplied from the fuel tank,
a fuel flow path which is connected to the fuel tank and the fuel cell stack and flows the fuel,
a pressure sensor which is arranged in the fuel flow path and detects a pressure of the fuel on the fuel tank side,
a valve which is arranged on a downstream side of the pressure sensor in the fuel flow path and is switched between flow and shutoff of the fuel by opening and closing,
a control portion which controls the opening and closing of the valve according to a detection value of the pressure of the fuel output from the pressure sensor, and
a branch portion which branches from the fuel flow path on a downstream side of the valve in the fuel flow path, and
the connection flow path connects the mutual branch portions of the plurality of electricity generation systems.

2. The fuel cell system according to claim 1,
wherein each of the plurality of electricity generation systems comprises:
a pressure regulation valve which is arranged on an upstream side of the branch portion in the fuel flow path and is in an open state when a pressure of the fuel on the downstream side is equal to or lower than a predetermined pressure, and
a bypass flow path which is arranged on the upstream side of the branch portion in the fuel flow path and bypasses the pressure regulation valve so as to be connected to the fuel flow path, and in which the valve is arranged.

3. A control method of a fuel cell system,
which is executed by the control portion of the fuel cell system according to claim 2, wherein
the control method of a fuel cell system comprises a step in which the control portion switches, based on detection values of the fuel pressures output from the pressure sensors of the plurality of electricity generation systems, the valve of the electricity generation system corresponding to the pressure among the pressures in the plurality of electricity generation systems which is lower than the pressure in the other electricity generation system from an open state to a closed state.

4. The control method of a fuel cell system according to claim 3, comprising a step in which the control portion switches the valve of the electricity generation system corresponding to the pressure among the pressures in the plurality of electricity generation systems which is lower than the pressure in the other electricity generation system by a predetermined pressure difference or more from an open state to a closed state.

5. The control method of a fuel cell system according to claim 4, comprising a step in which the control portion switches the valve in the closed state to the open state in a case other than a state that the pressure in the electricity generation system corresponding to the valve in the closed state is lower than the pressure in the other electricity generation system by a predetermined pressure difference or more.

6. The control method of a fuel cell system according to claim 3, comprising a step in which the control portion switches the valve in the closed state to the open state in a case other than a state that the pressure in the electricity generation system corresponding to the valve in the closed state is lower than the pressure in the other electricity generation system by a predetermined pressure difference or more.

7. A control method of a fuel cell system, which is executed by the control portion of the fuel cell system according to claim 1, wherein the control method of a fuel cell system comprises a step in which the control portion switches, based on detection values of the fuel pressures output from the pressure sensors of the plurality of electricity generation systems, the valve of the electricity generation system corresponding to the pressure among the pressures in the plurality of electricity generation systems which is lower than the pressure in the other electricity generation system from an open state to a closed state.

8. The control method of a fuel cell system according to claim 7, comprising a step in which the control portion switches the valve of the electricity generation system corresponding to the pressure among the pressures in the plurality of electricity generation systems which is lower than the pressure in the other electricity generation system by a predetermined pressure difference or more from an open state to a closed state.

9. The control method of a fuel cell system according to claim 8, comprising a step in which the control portion switches the valve in the closed state to the open state in a case other than a state that the pressure in the electricity generation system corresponding to the valve in the closed state is lower than the pressure in the other electricity generation system by a predetermined pressure difference or more.

10. The control method of a fuel cell system according to claim 7, comprising a step in which the control portion switches the valve in the closed state to the open state in a case other than a state that the pressure in the electricity generation system corresponding to the valve in the closed state is lower than the pressure in the other electricity generation system by a predetermined pressure difference or more.

* * * * *